United States Patent [19]

Stahl et al.

[11] Patent Number: 4,508,673
[45] Date of Patent: Apr. 2, 1985

[54] MOLDING OF GLASS WOOL WITH WRINKLE-FREE SURFACE

[75] Inventors: Steven B. Stahl, Granville; Shiv K. Bakhshi, Columbus; George M. Naul, Granville, all of Ohio

[73] Assignee: Owens-Corning Fiberglas Corporation, Toledo, Ohio

[21] Appl. No.: 606,859

[22] Filed: May 4, 1984

Related U.S. Application Data

[63] Continuation of Ser. No. 432,575, Oct. 4, 1982, abandoned.

[51] Int. Cl.³ .............................................. B29G 1/00
[52] U.S. Cl. .................................... 264/120; 264/119; 264/123; 264/324; 264/327
[58] Field of Search ............... 264/119, 120, 123, 126, 264/257, 324, 327

[56] References Cited

FOREIGN PATENT DOCUMENTS 754055  3/1967  Canada ............................... 264/120

Primary Examiner—James Lowe
Attorney, Agent, or Firm—Ronald C. Hudgens; Ted C. Gillespie; Paul J. Rose

[57] ABSTRACT

The process includes a first molding step with an upper surface of the glass wool pelt having been sprayed with water and with a lower surface of the glass wool pelt insulated from the lower mold portion by a previously molded glass wool insulating sheet, and a second molding step with the insulating sheet removed.

8 Claims, 1 Drawing Figure

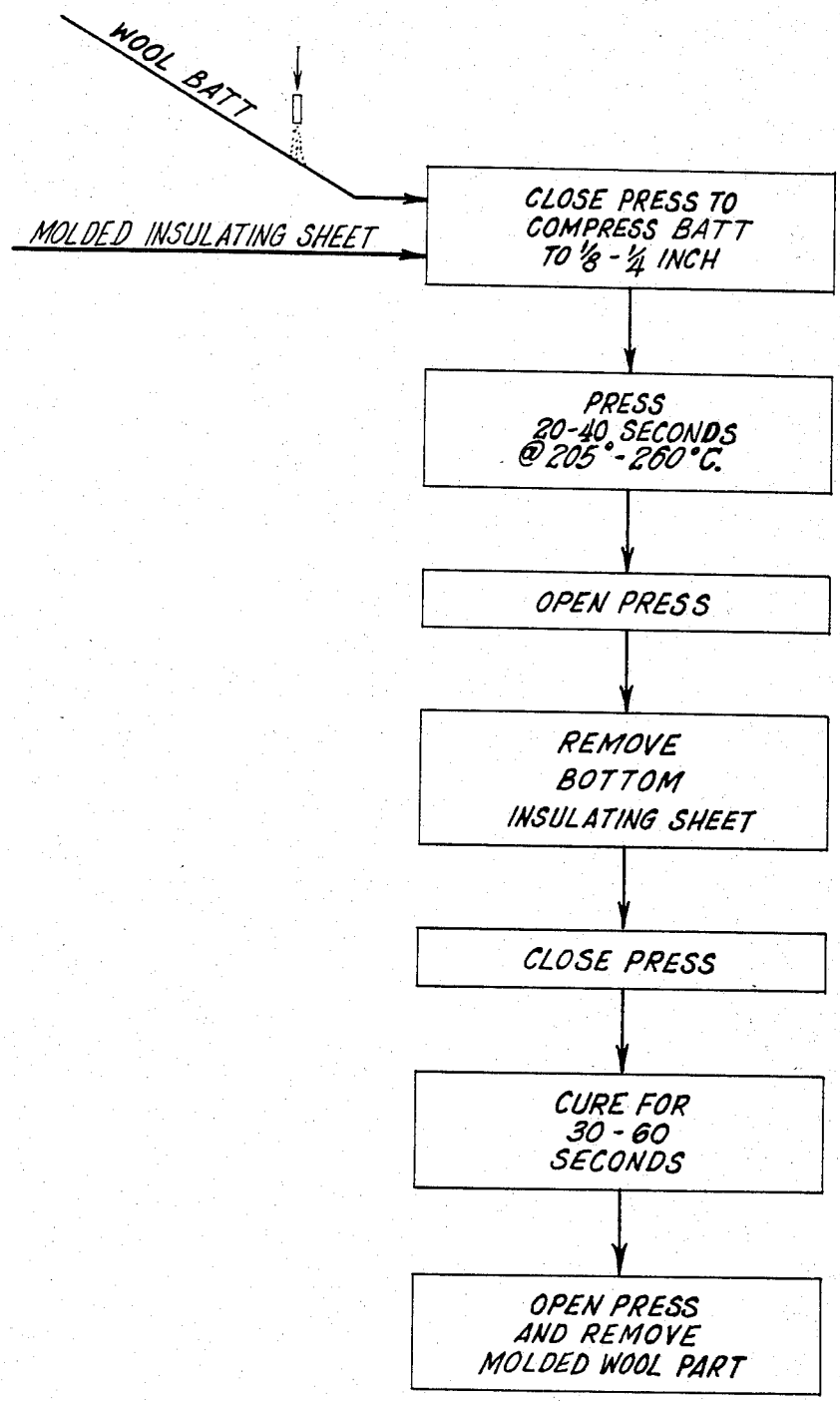

MOLDING OF GLASS WOOL WITH WRINKLE-FREE SURFACE

This is a continuation of application Ser. No. 432,575, filed on Oct. 4, 1982, now abandoned.

TECHNICAL FIELD

This invention relates generally to molding of fibrous glass material, and more particularly to a two-step molding process for producing a wrinkle-free surface on a contoured molded glass wool article such as an automobile headliner.

BACKGROUND ART

U.S. Pat. No. 3,507,730 discloses a process of making an automobile headliner with a foamed resin facing. Glass wool is molded in one molding press and a foamed resin facing is adhered to the molded glass wool in a second molding press. Fabric with a foam backing is also used as a facing for molded glass wool headliner bodies.

A finished headliner must have a flawless appearance to be acceptable. A persistent problem has been that frequently the molded glass wool body of a headliner had wrinkles or fissures on a front surface which is the surface to which the facing is attached. These wrinkles or fissures might even be substantially invisible on the bare molded wool, and yet, as incredible as it may seem, they will show up as flaws in the appearance of the facing after the facing is applied, even when the facing is a foam-backed fabric. The finished headliner then has to be scrapped. Blind people, with their highly developed sense of touch, have been employed to sort out and scrap molded glass wool bodies with wrinkles, before application of the facing thereto. This saves facing material and the labor of applying it, but fails to overcome the waste occasioned by the required scrapping of the molded glass wool bodies with wrinkles and the expense of the employees hired to sort.

DISCLOSURE OF INVENTION

In accordance with the invention, a process for molding glass wool with a wrinkle-free surface on at least one side has been provided, and is particularly useful for molding automobile headliner bodies.

BRIEF DESCRIPTION OF THE DRAWING

The drawing is a flow chart of the process of the invention.

BEST MODE OF CARRYING OUT THE INVENTION

A molding press having a mold similar to that shown in FIG. 3 of U.S. Pat. No. 3,507,730 is used, except that in addition to the upper male mold part's being heated, the lower female mold part is also heated and the molding surface of the upper male mold part is smooth rather than being provided with cross ribs.

As an example of the inventive process, a molded insulating sheet and a wool batt are placed in the lower female mold part. The insulating sheet is molded mineral or glass wool preferably from 0.5 to 0.75 inches thick, previously molded in the same or a similar mold. The wool batt is a blanket of mineral or glass wool preferably from 1 to 2 inches thick, with uncured binder such as phenolformaldehyde. The diameter of the mineral or glass fibers in the wool is preferably from 26 to 28 hundred thousandths of an inch although other diameters would work as well. A light spray of water is sprayed on the top surface of the wool batt. The water may contain a dye as an aid to providing uniform coverage. The molded insulating sheet is placed in contact with the lower female mold part, and the wool batt is placed on top. The press is then closed to compress the wool batt preferably to a thickness of from one-eighth to one-fourth of an inch and held only for from 20 to 40 seconds with the temperature of the upper male mold part preferably at from 205 to 260 degrees Celsius. The compression must be sufficient to crush all wrinkles flat and produce a partially cured, wrinkle-free skin preferably having a density of at least 10 pounds per cubic foot. At lesser densities, wrinkles may remain. The press is then opened and the previously molded insulating sheet is removed. Because the interior of the wool batt has not been cured, the batt will expand back toward its original thickness. The press is then closed again for from 30 to 60 seconds to finally cure the binder in the wool batt. Then the press is opened again and the molded glass wool headliner body is removed.

The water spray before and the use of the molded insulating sheet during the initial molding step seem to prevent curing of the surface before wrinkles are pressed out and result in a smooth surface. If the water spray is omitted, wrinkles may result and the surface will be fuzzy.

Various modifications may be made in the process without departing from the scope of the invention as set forth in the following claims.

We claim:

1. A process of molding a wool batt comprising mineral or glass wool with uncured thermosettable binder to produce a molded mineral or glass wool part with a wrinkle-free surface, said process comprising subjecting the wool batt to an initial molding step between heated molds after moistening the surface which is to be wrinkle-free, said initial molding step being carried out with an insulating sheet on the side of the wool batt opposite the moistened surface and resulting in a partially cured wrinkle-free skin at the surface which was moistened, and subjecting the wool batt to a second molding step between heated molds without the insulating sheet to cure the wool batt throughout its thickness.

2. A process of molding a wool batt comprising mineral or glass wool with uncured thermosettable binder in a molding press to produce a molded mineral or glass wool part with a wrinkle-free surface, said process comprising placing a molded mineral or glass wool insulating sheet previously molded in the same or a similar molding press on a heated lower mold portion of the press, moistening a surface of the wool batt and placing the wool batt over the molded insulating sheet with the moistened surface facing a heated upper mold portion of the press, closing the press long enough to produce a wrinkle-free skin at the moistened surface, opening the press and removing the molded insulating sheet, closing the press long enough to cure the wool batt throughout its thickness, and opening the press and removing the molded mineral or glass wool part.

3. A molding process as claimed in claim 2 wherein the upper and lower mold portions of the press are heated to a temperature of from 205 degrees to 260 degrees C.

4. A molding process as claimed in claim 3 wherein the press is closed for from 20 to 40 seconds the first time and for from 30 to 60 seconds the second time.

5. A process of molding a wool batt comprising mineral or glass wool with uncured thermosettable binder to produce a molded mineral or glass wool part with a wrinkle-free surface, said process comprising subjecting the wool batt to an initial molding step between heated molds, said initial molding step being carried out with an insulating sheet on the side of the wool batt opposite the surface which is to be wrinkle-free and resulting in a partially cured wrinkle-free skin at the surface which is to be wrinkle-free, and subjecting the wool batt to a second molding step between heated molds without the insulating sheet to cure the wool batt throughout its thickness.

6. A process of molding a wool batt comprising mineral or glass wool with uncured thermosettable binder in a molding press to produce a molded mineral or glass wool part with a wrinkle-free surface, said process comprising placing a molded mineral or glass wool insulating sheet previously molded in the same or a similar molding press on a heated lower mold portion of the press, placing the wool batt over the molded insulating sheet with the surface which is to be wrinkle-free facing a heated upper mold portion of the press, closing the press long enough to produce a wrinkle-free skin on the side of the wool batt facing the heated upper mold portion of the press, opening the press and removing the molded insulating sheet, closing the press long enough to cure the wool batt throughout its thickness, and opening the press and removing the molded mineral or glass wool part.

7. A molding process as claimed in claim 6 wherein the upper and lower mold portions of the press are heated to a temperature of from 205 degrees to 260 degrees C.

8. A molding process as claimed in claim 7 wherein the press is closed for from 20 to 40 seconds the first time and for from 30 to 60 seconds the second time.

* * * * *